May 8, 1934.  C. E. DIRKES  1,958,187
LUBRICATOR STRUCTURE
Filed Dec. 4, 1931
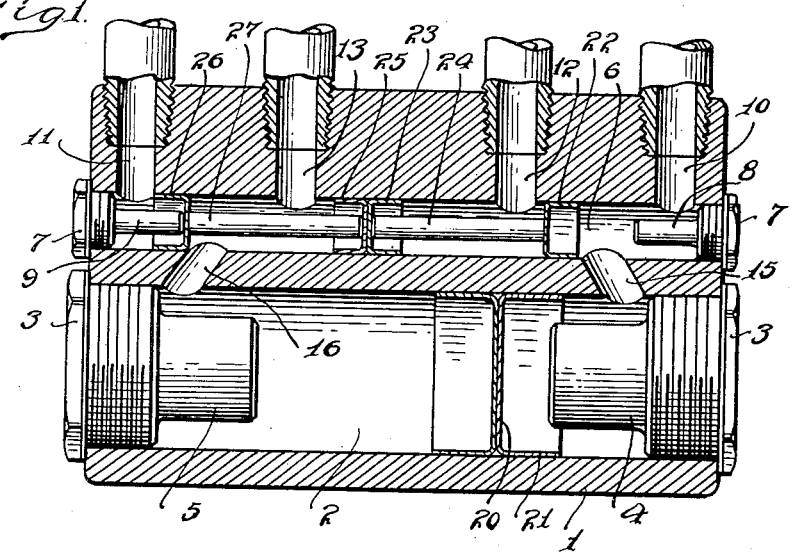
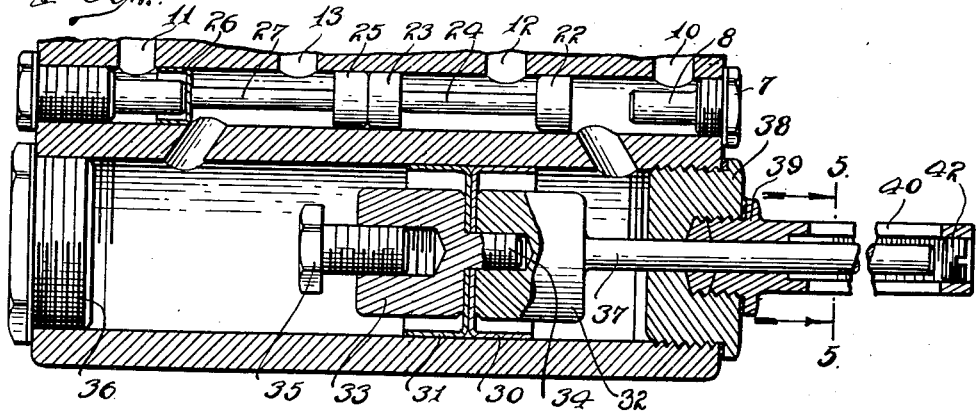
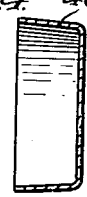
INVENTOR.
CARL E. DIRKES.
BY Barnes and Kisselle
ATTORNEYS.

Patented May 8, 1934

1,958,187

UNITED STATES PATENT OFFICE 1,958,187

LUBRICATOR STRUCTURE

Carl E. Dirkes, Detroit, Mich.

Application December 4, 1931, Serial No. 579,024

5 Claims. (Cl. 184—7)

This invention has to do with the structure of a lubricating device and it relates particularly to lubricating devices of the type in which lubricant is moved or ejected under pressure.

Such lubricating devices may be employed in a mechanism involving a cylinder, and a piston, the lubricant being forcefully moved by relative movement between cylinder and piston. It will be seen that under high pressures leakage will occur between the piston and cylinder walls unless there is a very close fit between these parts. Some of the cylinder and piston structures have quite small diameters, which fact adds to the difficulties of obtaining a nicety of fit of the pistons in their cylinders.

The present invention is concerned particularly with the provision of a piston especially useful in lubricating devices of the type mentioned, and which by reason of its structure forms a successful seal with the cylinder walls. The piston structure is one capable of being actuated upon by lubricant under pressure so that under such action its sealing engagement with the walls of the cylinder is insured. A piston constructed in accordance with this invention is capable of being relatively cheaply produced, and its initial fit in the cylinder need not necessarily be so accurate as pistons heretofore employed in such devices. A piston constructed in accordance with the invention is capable of seal against the walls of a cylinder wherein there are inaccuracies of machining, such as a slight out-of-round in the cylinder, or wherein the cylinder is slightly out of size, or wherein the cylinder diameter varies from end to end, or in other words, a little larger at one end than at the other.

In the accompanying drawing:

Fig. 1 is a sectional view taken through a block bored to form cylinders of a lubricating device, illustrating the pistons therein.

Fig. 2 is a sectional view illustrating a modified arrangement.

Fig. 3 is a sectional view of a modified type of piston.

Fig. 4 is a view of a further modified type of piston.

Fig. 5 is a section taken substantially on line 5—5 of Fig. 2.

A block of suitable metal is illustrated at 1, bored to form a cylinder 2 which may be closed at its opposite ends as by means of screw threaded blocks 3. These blocks may have projecting portions 4 and 5 for limiting piston movements in the cylinder. The particular block shown is drilled for a so-called two-line lubricating system. It has a second cylinder 6 which may be closed at opposite ends by blocks 7 which may be provided with extensions 8 and 9 serving as piston movement-limiting devices.

Four passageways may be drilled into the block communicating with the cylinder 6. Two are illustrated at 10 and 11, these being inlet passageways, and two being illustrated at 12 and 13, outlet passageways. Suitable conduits may connect to these passageways as shown.

The cylinders 2 and 6 are normally disconnected save for connecting passageways 15 and 16 which connect these cylinders at points near their ends.

A piston structure is designed to operate in the cylinder 2 between the ports 15 and 16, while pistons in the nature of valves are designed to operate in the cylinder 6 for controlling communication of some of the passageways to the cylinder 2.

The pistons are constructed so as to have a more or less of a hollow formation defined by a wall sufficiently flexible or resilient for expanding into close contact with the cylinder walls. Such a piston is illustrated in the cylinder 2 having a head 20 and a skirt 21. The piston is in the nature of a cup or receptacle formed of relatively thin metal and the skirt is of sufficient length to keep the piston properly positioned in the cylinder. Such a piston may be made of more or less resilient metal, for example copper, bronze, brass, or other alloys such as bronze, aluminum alloy, or for that matter, it may be made of ferrous metal. The actual formation of the piston may be accomplished in any desirable manner, and for example, the same may be merely a stamping. The piston is designed to be actuated by lubricant or the like under pressure and preferably, when so actuated, the lubricant under pressure is on the concave side of the cup so that the lubricant enters the same, and being under pressure expands the skirt into engagement with the cylinder walls. The particular structure shown in Fig. 1 is for a two-line lubricating system, and the lubricant under pressure accordingly occurs in opposite ends of the cylinder 2, for which purpose the piston structure therein may be doubled, or in other words, comprise two cup pistons placed back to back as shown. They may or may not be secured together. In the cylinder 6, which may be of smaller diameter than the cylinder 2, there are pistons serving as valves, one being shown at 22 and one at 23, and these two pistons may be held properly spaced apart by a spacer rod 24 which may be secured to the piston heads in any desired manner. Other valve pistons are at 25 and 26 similarly spaced apart by spacer rod 27.

The particular device may operate as follows: Lubricant under pressure may be caused to enter passageway 10; the piston 22 may have been butting up against the stop 8 similar to the position in which piston 26 is shown butting the stop 9. The pressure of the lubricant acting upon piston 22 shifts the entire piston structure in cylinder 6 to the position shown in Fig. 1. This opens port 15 and a lubricant passes into cylinder 2, and the pistons therein are shifted from the right hand end of the cylinder to the left hand end where they are stopped by the stop 5. The lubricant in the cylinder 2 is thus forced through the port 16 through a portion of the cylinder 6 and out through the bore 13. The conduit leading from this bore may be directed to any point desired to be lubricated. In the next operation the lubricant under pressure enters passageway 11 and the piston valve structure of cylinder 6 is shifted so that piston 26 opens port 16 so that it connects passageway 11 and cylinder 2 and closes off the port 13, while piston 22 is shifted to close cylinder 6 from connecting passageway 10 and to open port 15 to the outlet passageway 12. The lubricant under pressure then passes into cylinder 2 at the left hand end and shifts the piston structure from left to right until it is stopped by the member 4, the lubricant in the right hand end of cylinder 2 being forced out through passageway 15, cylinder 6 and outlet passage 12, to any mechanism to be lubricated.

A modified form of mechanism employing the same piston structure is shown in Fig. 2. Here the piston structure may comprise two cup shaped members 30 and 31 placed back to back and into which are fitted plug like members 32 and 33 which may be screw threaded together by a screw threaded projection 34 passing through the piston heads. For limiting the piston movement in one direction a screw threaded member 35 may be affixed to head 33 for connection with plug 36. The member 32 may have a projection in the form of a rod 37 slidably situated in the bushing 38 which may be provided with a packing nut 39. A tubular like structure 40 may be extended from the packing nut and may be provided with slotted walls, as illustrated at 41 in Fig. 5, for rendering the end of the rod 37 visible; and a stop screw 42 may be screw threaded into the end of the tubular like structure. This stop screw limits the piston movement and is advantageously adjustable upon screw threads. An operator may thus observe the position of the end of rod 37 thus to determine the position of the piston in the cylinder.

A modified form of piston is shown in Fig. 3 wherein the wall of the skirt is tapered, as illustrated at 45 thus rendering the same of increased flexibility. This tapering may result from drawing of the metal in the stopping or forming operation. In Fig. 4 the skirt 46 flares outwardly from the head so that the skirt may be slightly compressed by the cylinder walls upon placement of the piston in the cylinder.

The pressures encountered in such a device ordinarily run up to 3000 pounds per square inch, and the pressure builds up particularly when the piston structure of cylinder 2 becomes abutted against the stop at one end of the cylinder. A piston of solid metal, or a piston otherwise machined is incapable of forming an effective seal under such pressure unless extremely accurately fitted in the cylinder. Much difficulty has been encountered in providing fits with such pistons to form an effective workable structure. Furthermore, the machining of the cylinder must be as accurate as that of the piston. If any wear takes place between the cylinder piston and cylinder wall, leakage will result; likewise, leakage also results by parts not fitting, with the result that the piston, cylinder or bore are out of round.

With the present piston, pressure which builds up in the right hand end of cylinder 2 is effective on the inside walls of the piston skirt and causes the same to expand as it is sufficiently flexible for this purpose. It has been found that such a piston will form an effective seal notwithstanding out of round conditions in the cylinder, or even a relatively loose fit of the piston therein. Even though the cylinder is slightly larger in diameter at one end than the other, the expansion takes care of this and forms an effective seal. Of course the same thing is true when lubricant under pressure enters the left hand end of cylinder 2. The same action occurs with the valve pistons, when lubricant under pressure from inlet passageway 10 presses against the piston 22 the latter effectively seals off the outlet passage 12. Pistons 25 and 26 define the passageway for lubricant out of passageway 13. Ordinarily this pressure is not so high that a reversed piston such as piston 26 is not sufficient for this location. Pistons which have been formed of stock .015 inches in thickness have produced good results. Such pistons have been formed by a pressure or stamping operation, and the skirts, due to metal drawing were reduced in thickness so that the skirts were somewhat less than .015 inches. This is diagrammatically illustrated in Fig. 3, and of course the skirt is more flexible with a thinner cross section of the given metal. Pistons such as shown in Fig. 4 may be contracted when squeezed into a cylinder.

This piston structure materially facilitates manufacture and assembly of such lubricating devices. The cylinders in the block may be machined and provided with the usual accuracy, and the pistons may be formed in large numbers. Ordinarily the usual machine accuracy is not adequate in this kind of a pressure lubricator as special accuracy must be maintained. The cylinder blocks and pistons may then be assembled and perfect operation is assured as each piston is capable of expanding and accommodating itself to a cylinder. This is especially advantageous where a number of pistons are located in a relatively long cylinder formation such as the piston structure shown in the cylinder 6.

The piston structure has actually been found to hold pressures without leakage in excess of those ordinarily encountered in a commercial lubricating device. For example, in a structure using these cup pistons some one-quarter inch in diameter and some about five-eighths inch in diameter, lubricant under ten thousand pounds pressure has been held without leakage. The structure was one not especially designed or fitted for a high pressure test, but merely a standard type of structure wherein the pistons were placed in their cylinders in the usual manner without any special machining or fitting operation. In some installations the device may be subjected to considerable heat. This, obviously, causes expansion of the metal constituting the cylinders, and with solid pistons leakage may occur as the cylinder walls pull away from the pistons due to unequal expansion. The unequal expansion may come about by reason of different metals or because the block of metal constituting the cylinders is not directly exposed to the heat. The present invention overcomes leakage under such circumstances as the pistons readily expand under the existing pressure to maintain a sealing engagement with the cylinder walls.

I claim:

1. In a lubricator structure, a piston for working in a cylinder and adapted to be shifted therein by the lubricant under pressure, said piston comprising a relatively thin sheet of flexible metal fashioned into cup shape with the bottom of the cup constituting a piston head, and the side wall of the cup constituting the piston skirt, said skirt presenting a tapered form with the cross diameter at the free edge of the skirt greater than the cross diameter adjacent the head, and the said diameter at the free end of the skirt being normally slightly greater than the diameter of the cylinder whereby upon insertion of the piston in the cylinder the skirt may be compressed to tightly engage the cylinder wall, the skirt of the piston tapering in thickness substantially from the bottom to the free edge of the skirt, said piston being disposed in the cylinder with the open side thereof facing toward the end of the cylinder receiving lubricant under pressure whereby the lubricant under pressure has access to the interior surfaces of the skirt to tend to expand the same into sealing engagement with the cylinder wall.

2. A lubricator structure, a piston for working in a cylinder and shiftable by the lubricant under pressure and adapted to urge the lubricant ahead of same out of the end of the cylinder towards which the piston is being urged, said piston comprising a pair of cup shaped stampings of relatively thin flexible metal placed back to back, said backs constituting a piston head and the side walls of the cup shaped stampings constituting piston skirts, the lubricant under pressure having access to the interior surfaces of the skirts whereby the lubricant tends to expand the same into sealing engagement with the cylinder wall.

3. A lubricator structure, a piston for working in a cylinder shiftable by the lubricant under pressure and adapted to urge the lubricant ahead of same out of the end of the cylinder towards which the piston is being urged, said piston comprising a pair of cup shaped stampings of relatively thin flexible metal placed back to back, said backs constituting a piston head and the side walls of the cup shaped stampings constituting piston skirts, the lubricant under pressure having access to the interior surfaces of the skirts whereby the lubricant tends to expand the same into sealing engagement with the cylinder wall, and means securing the backs of the pistons together.

4. A lubricator structure, a piston for working in a cylinder shiftable by the lubricant under pressure and adapted to urge the lubricant ahead of same out of the end of the cylinder towards which the piston is being urged, said piston comprising a pair of cup shaped stampings of relatively thin flexible metal placed back to back, said backs constituting a piston head and the side walls of the cup shaped stampings constituting piston skirts, the lubricant under pressure having access to the interior surfaces of the skirts whereby the lubricant tends to expand the same into sealing engagement with the wall of the cylinder, said skirts being normally of tapering form whereby the normal diameter at the free edge of each skirt is greater than the diameter of the cylinder whereby the skirts may be compressed upon insertion of the cup shaped members into the cylinder to engage the wall of the cylinder with sealing action.

5. In a lubricator structure, a piston for working in a cylinder and adapted to be shifted therein by lubricant under pressure, said piston comprising a relatively thin piece of metal fashioned into cup shape with the bottom of the cup constituting the piston head, and the side wall of the cup constituting the piston skirt, the piston skirt being of tapering form in cross section with the thickness of the metal decreasing substantially from the bottom of the cup to the free edge of the skirt, said piston being adapted to be disposed in a cylinder so that lubricant under pressure has access to the interior surfaces of the skirt and the tapering form of said skirt providing flexibility whereby the same may be explained by lubricant under pressure against the cylinder wall of the cylinder to form a sealing engagement therewith.

CARL E. DIRKES.